UNITED STATES PATENT OFFICE.

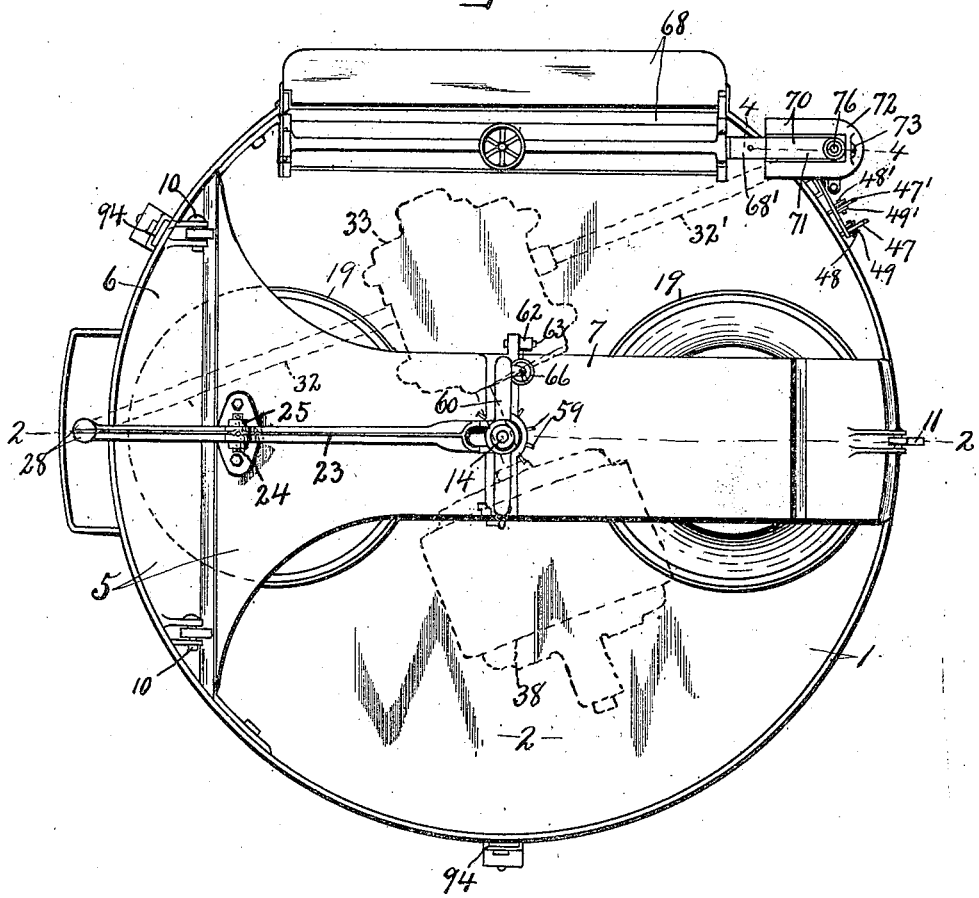

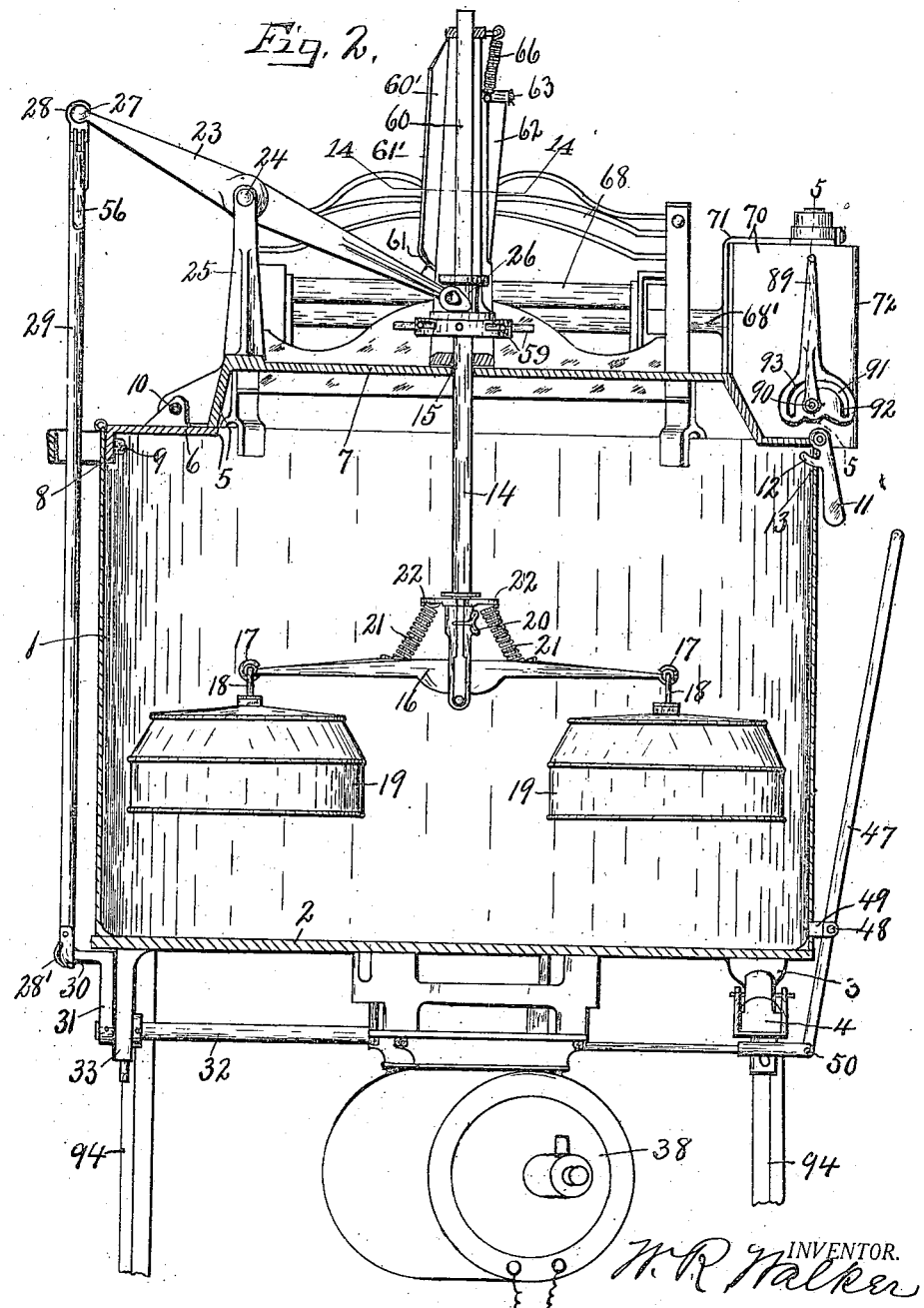

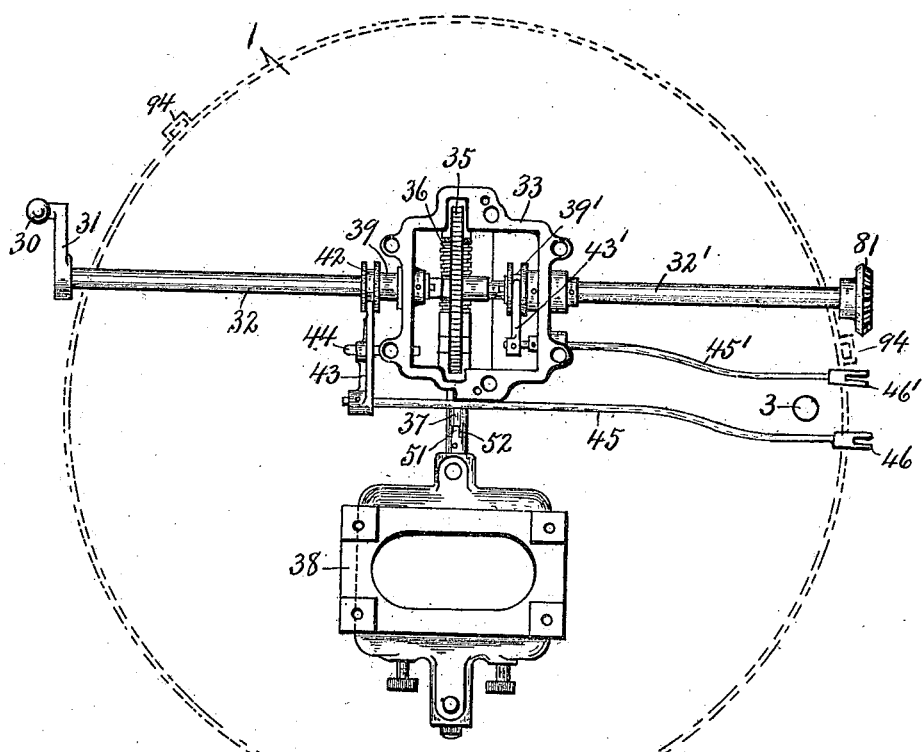

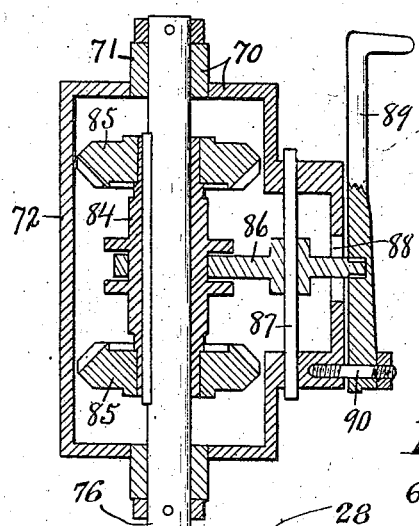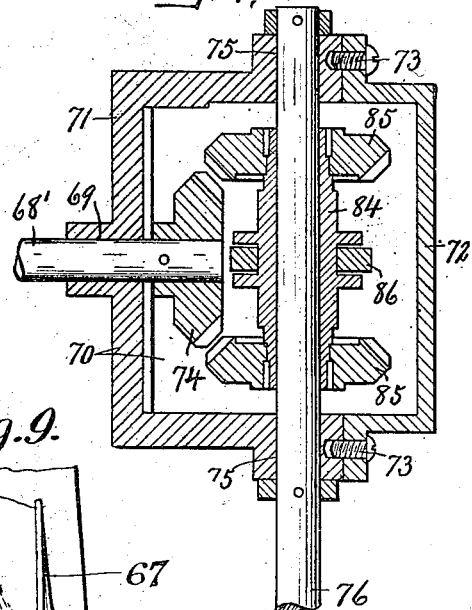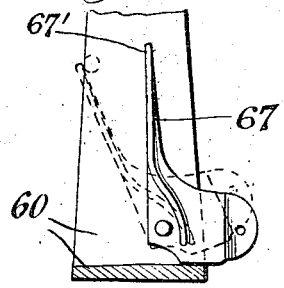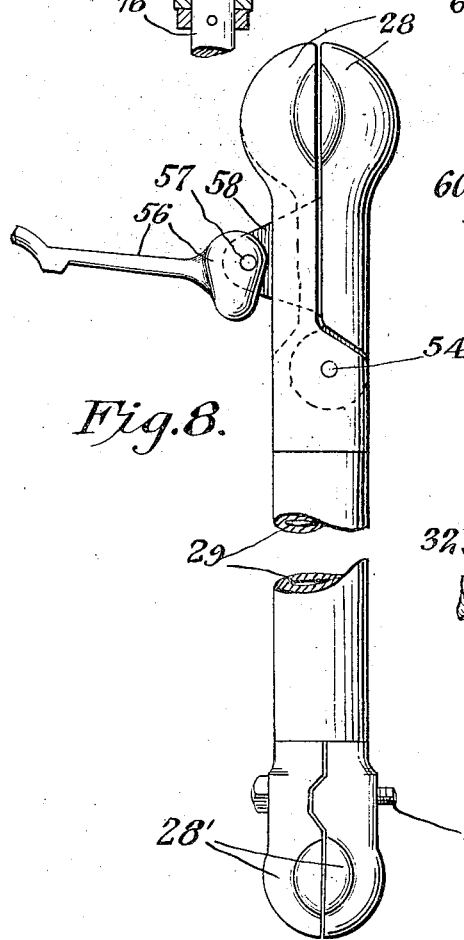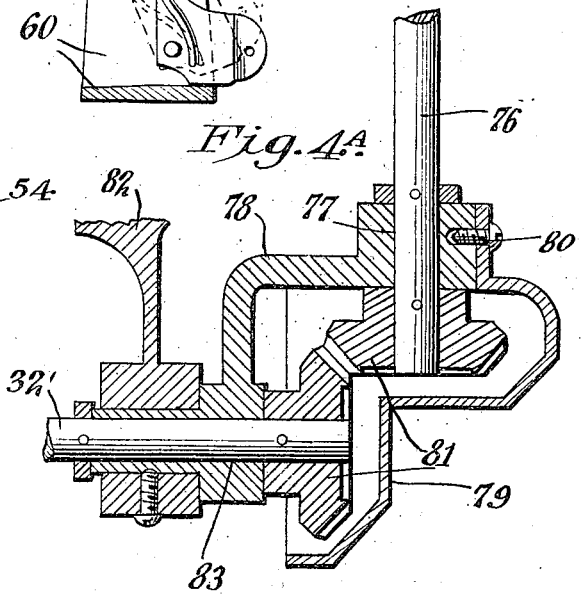

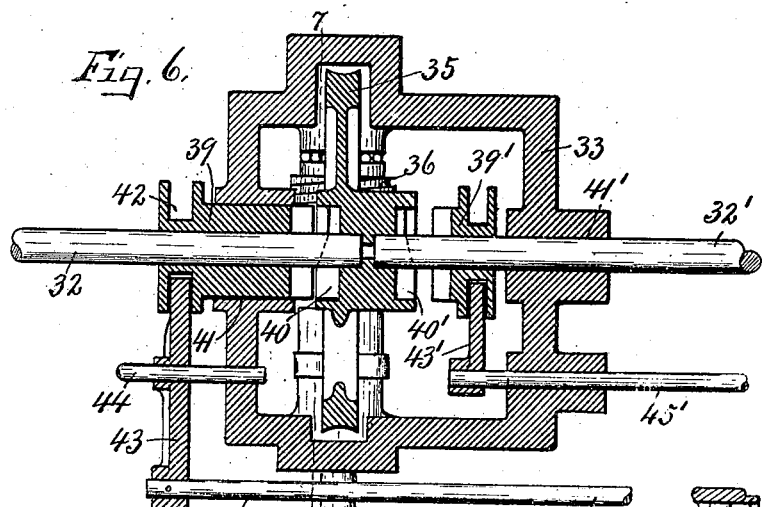

WILLARD R. WALKER, OF SYRACUSE, NEW YORK, ASSIGNOR TO THE WALKER BROTHERS COMPANY, OF SYRACUSE, NEW YORK, A CORPORATION OF NEW YORK.

CLOTHES-WASHING MACHINE.

1,402,196.     Specification of Letters Patent.     Patented Jan. 3, 1922.

Application filed January 2, 1920. Serial No. 348,922.

*To all whom it may concern:*

Be it known that I, WILLARD R. WALKER, of Syracuse, in the county of Onondaga, in the State of New York, have invented new and useful Improvements in Clothes-Washing Machines, of which the following, taken in connection with the accompanying drawings, is a full, clear, and exact description.

This invention relates to certain improvements in clothes-washing machines involving the use of a pair of cup shaped dashers which are mounted upon a vertically reciprocatory and intermittingly rotatable plunger extending through a suitable support across the top of the vat and driven by an electric motor on the under side of the vat through the medium of suitable connections between the motor and plunger, in combination with a wringer mechanism attached to one side of the upper edge of the vat and suitable mechanism for transmitting motion from the motor to the wringer rolls.

The main object is to increase the general working efficiency and convenience of operation and control of machines of this type,—

First, by affording free use of the entire area of the interior of the vat from bottom to top without any obstructions, as distinguished from that type of machine in which the cup-shaped dashers are operated by a plunger extending through the bottom of the vat;

Second, by permitting the plunger support and guide to be rocked upwardly and laterally in such manner as to withdraw the cup-shaped dashers through the open top and to one side of the vat, whereby to permit free access to the interior of said vat for the expeditious insertion and removal of the clothes and washing fluid therefor;

Third, by providing for the free flexing or tilting movement of the dashers in all directions to compensate for unequal accumulations of clothes with which they may come in contact in the vat, particularly when exerting pressure upon said clothes;

Fourth, by providing more efficient and positive means for intermittingly rotating the plunger with the dashers thereon as they are lifted above the level of the clothes in the vat;

Fifth, by simplifying the mechanism by which power is transmitted to the plunger and to the wringer rolls including the control mechanism for starting and stopping the plunger and wringer rolls.

Other objects and uses relating to specific parts of the machine will be brought out in the following description.

In the drawings:—

Figure 1 is a top plan of a washing machine embodying the various features of my invention.

Figure 2 is a vertical sectional view of the same machine, taken on line 2—2, Figure 1.

Figure 3 is a top plan of the mechanism below the bottom of the vat, the latter being shown by dotted lines.

Figs. 4 and 4ª are enlarged vertical sectional views of the upper and lower gear housings and gears therein taken in the plane of line 4—4 Fig. 1 as parts of the mechanism for transmitting motion from the motor to the wringer.

Figure 5 is an enlarged vertical sectional view taken on line 5—5, Figure 2.

Figure 6 is an enlarged horizontal sectional view through the worm gear housing in the plane of the motor-driven countershaft, showing more particularly the worm gear and clutches cooperating therewith to control the movement of the plunger and wringer mechanisms.

Figure 7 is a vertical sectional view, taken in the plane of line 7—7, Figure 6.

Figure 8 is an enlarged side elevation, partly broken away, of the pitman connection between the counter-shaft and walking beam for operating the plunger.

Figures 9, 10, and 11, are detailed views of the cam mechanism for cooperating with the stud wheel on the plunger for intermittingly rotating said plunger with the dashers thereon, as the latter are raised above the level of the clothes in the vat.

Figs. 12 and 13 are enlarged transverse sectional views taken respectively on lines Y—Y and X—X Fig. 11.

Fig. 14 is a horizontal sectional view through the upright cam supporting frame and cam levers thereon showing the underlying collar carrying the radial pins which cooperate with the cams to impart intermittent rotary motion to the plunger and dashers carried thereby, the section being taken in the plane of line 14—14 Fig. 2 looking downwardly.

As illustrated, this machine comprises a cylindrical sheet-metal drum —1— rigidly and permanently secured at its lower surface by welding, brazing, or otherwise, to a cast-metal bottom —2— to form a water-tight vat adapted to contain the fluid and clothes to be washed, the bottom —2— being provided with a drainage outlet —3— having a valve —4— for retaining or drawing off the water as may be desired, the upper surface of the bottom —2— being slightly inclined toward the outlet to effect the complete drainage of the water therefrom when the valve is open.

A plate or bar —5— extends diametrically across the top of the vat and is preferably composed of sections —6— and —7—, one of which, as —6—, consists of a segment of relatively short radial width having a circular pendant flange —8— secured by bolts —9— to the inner face of the upper end of one side of the vat, while the other section, as —7—, extends across the major portion of the diameter of said vat and is hinged at one end at —10— to the segment —6—, its opposite end being adapted to rest upon the adjacent upper edge of the vat and is provided with a catch or lock lever —11— hinged thereto and adapted to be moved into and out of interlocking engagement with the adjacent side of said vat for locking and releasing the bar or plate —5— in and from its operative position, and for this purpose the lever —11— is provided with a hook —12— adapted to enter an opening —13— in the adjacent side of the vat near the top thereof, as shown more clearly in Figure 2.

The major portion of the section —7— which is adapted to swing vertically about its pivot —10— is elevated above the ends thereof to form a sort of bridge structure capable of supporting parts of the plunger operating mechanism hereinafter described, the elevated portion being disposed in a horizontal plane some distance above that of the upper edge of the vat to permit a clear view of the clothes and action of the dashers thereon at all times, and also to permit adjustment of the clothes in the vat if necessary without displacing the section —6— from its operative position.

A vertically reciprocatory plunger —14— extends through and is guided in a central opening —15— in the section —7— coaxial with the axis of the vat and carries at its lower end a rock-arm —16— which is centrally pivoted to said plunger for vertical rocking movement and extends diametrically of the vat in opposite directions an equal distance therefrom, the opposite ends of said rock-arm being provided with eyes —17— for receiving similar eyes —18— on the upper ends of a pair of cup-shaped dashers —19—.

The eyes —18— are centrally secured to the upper closed ends of the dashers —19— and together with their companion eyes —17— constitute swivel connections between said dashers and outer ends of the rock-arm —16— to allow said dashers to tilt in all directions, particularly when their lower ends are brought into contact with the uneven surfaces of the clothes which may be supported on the bottom of the vat.

The lower end of the plunger —14— carrying the rock arm —16— is preferably removable, but is normally secured to the plunger rod by means of a set screw —20—, thus permitting the rocker arm with the dashers thereon to be made up as a separate unit and afterwards applied to or removed from the plunger rod.

Suitable springs —21— connect portions of the rock-arm —16— at opposite sides of the pivot with laterally projecting shoulders or wings —22— on the plunger —14— and are normally tensioned to yieldingly hold the rock-arm in a substantially horizontal position and also to permit either end of the lever to tilt vertically against the action of said springs in case a greater volume of clothes should be engaged by one dasher than those engaged by the other, or in other words to compensate for varying thicknesses of clothes, particularly during the compression stroke of the plunger, thereby permitting substantially uniform pressure upon all portions of the clothes engaged by both dashers, which greatly expedites the washing operation.

The means for reciprocating the plunger —14— and its dashers —19— within the vat preferably consists of a walking beam or lever —23— pivoted or fulcrumed intermediate its ends at —24— to an upright bracket or post —25—, which in turn, is secured by bolts to the end of the elevated portion of the section —7— nearest the pivot —10—.

The inner end of the lever —23— is bifurcated and its opposite arms are interposed between the flanges of a grooved collar —26— which is secured to the plunger rod —14— and thus permits the plunger rod —14— with the dashers to turn or rotate freely in a manner hereinafter described.

The outer end of the walking beam —23— is provided with the ball or spherical bearing —27— for insertion in a spherical socket —28— which is mounted upon the upper end of a pitman rod —29—.

This pitman rod extends upwardly along the outside of the vat but in close proximity thereto and has its lower end provided with a similar spherical socket —28'— for receiving a spherical bearing —30— on a portion of a crank arm —31— which, in turn, is secured to a horizontally extending counter-shaft —32—.

This counter-shaft is journaled in suitable bearings —33— on the under side of the cast metal bottom —2— of the vat and extends within a gear case —34— which is also secured to the under side of the vat.

A worm gear —35— is loosely mounted on the inner end of the counter-shaft —32— within the gear case —34— and meshes with a worm —36— on the armature shaft —37— of an electric motor —38—.

This motor is secured to the under side of the bottom —2— of the vat with its armature shaft disposed in a horizontal plane at substantially right angles to the axis of the counter shaft —32—, thereby establishing a direct drive between the motor and counter-shaft for transmitting motion to the plunger —14— and dashers —19— carried thereby through the medium of the pitman —29— and walking beam —23—.

Suitable means is provided for locking the worm gear —35— to the counter-shaft —32— and in this instance consists of a clutch collar —39— splined or feathered on the counter-shaft and movable axially into and out of engagement with a clutch face —40— on the adjacent end of the worm gear —35— so that when those parts are interlocked, the rotation of the gear by the motor will be transmitted through the clutch collar —39— to the shaft —32— for operating the plunger and dashers carried thereby. On the other hand, when the clutch is disengaged and the motor is in operation, the worm gear —35— will be rotated without affecting the operation of the counter-shaft.

The clutch collar —39— is slidably mounted in an opening —41— in the adjacent end wall of the gear case —34—, said opening constituting a journal bearing for supporting the clutch collar and adjacent end of the shaft —32—.

The outer end of the clutch collar is provided with an annular groove —42— for receiving the forked end of a shifting member —43— which is slidably mounted on a guide pin —44— on the gear case —34— and is secured to one end of a shifting rod —45— which extends horizontally under the vat and slightly beyond one side thereof where it is provided with a forked head —46—, Figure 3.

A hand lever —47— is pivoted at —48— to a suitable stud —49— on the adjacent side of the vat near the bottom thereof and extends vertically in opposite directions therefrom, its lower end being pivotally connected at —50— to the forked head —46— while its upper end extends along the outside of the vat to a point within easy reaching distance of the operator so that when rocked inwardly toward the vat it will cause the clutch collar —39— to engage the worm gear —35— for locking the latter to the counter-shaft —32— for operating the plunger, and when moved in a reverse direction will release the clutch and thereby disconnect the counter-shaft from the motor-shaft for stopping the operation of the plunger.

The motor-shaft —37— is preferably made in sections one of which is journaled in the gear case —34— and the other in the motor case, the meeting ends of the sections being provided with interlocking tongue and groove sections —51— and —52— to transmit rotary motion from one to the other and also to permit the motor or gear case to be removed without displacing the shaft sections from their respective bearings.

The spherical bearings or sockets —28— and —28'— and opposite ends of the pitman rod —29— are preferably divided or split diametrically and separable to permit them to be placed over and upon their respective ball bearings —27— and —30—, the portions of the lower bearing or socket —28'— at opposite sides of the division being adapted to be drawn together to close upon the corresponding bearing —30— by means of a clamping screw or bolt —53— when adjusted for use.

One of the jaws of the upper spherical socket —28— is preferably pivoted at —54— to the other jaw or to the pitman rod —29— some distance from its spherical bearing face and is provided with an intermediate lug —55— projecting laterally through an opening in the adjacent portion of the opposite jaw for receiving a cam lever —56— which is pivoted thereto at —57— and is provided with a cam —58— for engaging the adjacent face of the relatively fixed jaw when the lever is rocked downwardly from the position shown in full lines in Figure 8, thereby firmly drawing the jaws together upon the spherical bearing —27—, or by the return movement releasing said jaws and allowing the pitman to be disconnected from the walking beam —23—.

In machines of this character, it is desirable to change the positions of the dashers at intervals so as to engage different portions of the clothes as the plunger is depressed, this adjustment being preferably made by an intermittent angular movement of the plunger and its dashers during the upward movement of the plunger when it is free from engagement with the clothes, and for this purpose the grooved collar —26— which is secured to the plunger rod —14— is provided with a series of radially projecting pins —59— in uniformly spaced relation circumferentially for successive engagement with the cam mechanism shown in Figures 9, 10, 11, and 14, whereby the plunger and dashers thereon are caused to be rotated one pin space at each upward movement of the plunger.

In Figures 2, 9, 10, and 11 is shown a bracket —60— secured to and rising from the center of the section —7— and provided with a fixed cam surface —61— which is inclined upwardly in the direction in which it is desired to rotate the plunger and overhangs the outer ends of the pins —59— as they are successively brought to a position in vertical alinement with the lower edge thereof, the circumferential length of the cam being sufficient to cause the rotation of the plunger one pin space as the underlying pin rides thereagainst during the upward movement of the plunger.

A rocking member —62— is pivoted at —63— to the bracket —60— some distance above the cam face —61— to swing outwardly away from the axis of the collar —26— and is provided with two cam faces —64— and —65— inclining in planes at right angles to each other, the cam —64— inclining downwardly and inwardly from its upper end above the lower end of the cam —61— and normally some distance inwardly beyond the circle of travel of the outer ends of the pins —59—, but terminates at the upper end of the cam —65— which is nearly coincident with the cam —61— so as to normally form a continuation thereof.

The cam face —64— is disposed in the plane of vertical travel of one of the pins which may be registered therewith during the downward movement of that particular pin as the plunger descends, so that the pin may engage said cam face —64— and rock the lower end of the lever —62— outwardly upon its pivot —63—, but as soon as the pin leaves the lower end of the cam —64— it allows the lever to be returned to its normal position by a retracting spring —66—, Figure —10—, thereby bringing the cam —65— directly over the same pin as the plunger continues to descend to the limit of its downward movement.

Then, as the upward movement of the plunger begins the same pin will successively encounter the cams —65— and —61— which incline in the same direction and will cause the plunger to be rotated one pin space thereby bringing the same pin to the position shown at —a— and the next succeeding pin to the position shown at —b—, Fig. 10, whereupon the plunger will continue to move upwardly without further turning, the backward turning movement of the plunger being prevented by a lever —67—, Figure 9.

The upper end of the cam face —61— merges into an upright bearing edge —61'— forming one side of the adjacent upright bar as —60'— of the frame —60— and adapted to be engaged by the adjacent pin —59— as the vertical movement of the plunger and dashers continue after riding off the upper end of the cam —61— which causes the rotation of the plunger and dashers carried thereby in the direction indicated by arrow M Fig. 14, the engagement of the upright guide face —61'— by the adjacent pin —59— serving to hold the plunger and dashers against movement in a reverse direction as the plunger is moved to its extreme upward limit and returned.

The inner corner of the upright bar —60'— opposite the guide face —61— is cut away to form an additional upright guide face —59'— which is parallel with the face —61'— and spaced apart therefrom circumferentially of the collar —26— a distance approximately equal to the spaces between the pins —59— so that when one pin is engaged with the face —61'—, the next succeeding pin will be engaged with the face —59'—, thereby holding the plunger against angular movement while traveling to its extreme upward position and return.

When the plunger is in its extreme downward position as shown in Figs. 2 and 14, one of the pins —59— projects into the recess or channel in the bar —60'— below the cam —61— while the diametrically opposite pin projects part way across the adjacent upright face of the guide lever —67— at which time the lever —62— will have assumed its normal position as shown in Fig. 14 with its cam face —65— over-hanging the adjacent pin —59—.

Now if the plunger is moved upwardly, the pin —59— underlying the cam —65— will be brought first against said cam and then against the cam —61— which together will cause the turning movement of the plunger one pin space in the direction indicated by arrow M Fig. 14 and at the same time will bring the next succeeding pin close to the cam face —59'— and immediately above the cam —64— which faces the collar —26—, the first named pin being then registered with the upright guide face —61'— so that the two pins adjacent the guide faces —59'— and —61'— will hold the collar and plunger against further movement in either direction as the plunger continues its upward and return movements.

While the collar —26— and its plunger —14— are being partially rotated in the manner just described, the pin adjacent the upright face of the guide lever —67— will have been moved away from said lever while the next succeeding pin will have taken its place by riding against and over the upper end of said lever, allowing the latter to return to its normal position at the end of the partial turning movement of the collar.

Now assuming that the plunger —14— is at the extreme limit of its upward movement and is returning downwardly, then as it approaches the limit of its downward movement, the pin —59— directly over the cam face —64— will engage said cam face and rock the adjacent lower end of the lever —62— outwardly until the same pin passes below said cam face at which time the lever will return automatically to its normal position to cause its cam face —65— to overhang the adjacent end of the same pin ready for repetition of the turning operation previously described.

While the lever —62— is being forced outwardly by the engagement of the adjacent pin —59— by the cam face —64—, the next preceding pin will be in substantially the same horizontal plane as the cam face —65— and unless prevented would permit the backward movement of the collar —26— and its pins —59— but this backward movement is prevented by the engagement of the diametrically opposite pin with the upright guide face as —67'— of the lever —67—.

Wringer operating mechanism.

A wringer —68— is suitably secured to the upper marginal edge of one side of the vat with its wringer rolls one above the other and substantially parallel with the longitudinal center of the plate or bar, the shaft as —68'— of the lower wringer roll being extended through a suitable bearing —69— and into a gear case —70— which consists of a stationary section —71— suitably secured to the upper edge of the tub or vat at one end of the wringer, and a removable section —72— clamped to the section —71— by screws —73—.

Secured to the outer end of the shaft —68'— is a bevel gear —74— which is located within the gear case —70—. The lower and upper walls of the fixed section —71— of the gear case are provided with journal bearings —75— in which is journaled the upper end of a vertical shaft —76— having its lower end extended below the bottom of the tub through a suitable bearing —77— of a gear case —78—, the latter having a removable section —79— held in place by a clamping screw —80— to permit access to the inclosed gears when necessary.

This gear case —78— contains a pair of intermeshing bevel gears —81— one of which is secured to the lower end of the upright shaft —76—, the other being secured to a horizontal counter-shaft —32'— which is coaxial with the counter-shaft —32— and is adapted to be driven by the same motor —38—.

The gear case —78— is secured in a bracket —82— on the bottom —2— of the tub and forms a bearing —83— for the adjacent end of the shaft —32'—.

A sleeve —84— is slidably mounted upon the upper end of the upright shaft —76— within the gear case —70— and is feathered or splined to said shaft to rotate therewith. Secured to the opposite ends of this sleeve is a pair of similar bevel gears —85— which are movable into and out of engagement with opposite faces of the bevel gear —74— for reversing direction of rotation of the wringer rolls, or may be moved to a neutral position to allow the wringer rolls to remain at rest.

The central portion of the sleeve —84— is provided with an annular groove for receiving a shifting member —86— which is slidably mounted on a guide-rod —87— on the removable section —72— of the gear case —70—, as shown more clearly in Figure 5, the inner end of said shifting member being forked to engage said groove while its outer end extends through an elongated slot —88— in the outer wall of the section —72—.

A hand-operated cam lever —89— is pivoted at —90— to the removable section —72— and is provided with an eccentric slot —91— extending through an arc of substantially 180° around the pivot —90— and having its opposite walls constituting cam faces —92— and —93— for engaging the outwardly protruding end of the shifting member —86— and moving said member together with the sleeve —84— and gears —85— carried thereby axially to their different positions for driving the wringer rolls in one direction or the other or stopping the rolls as may be desired.

The counter-shaft —32'— extends through and is journaled in a suitable bearing —41'— on the gear case —33—, and also extends into a central opening in the hub of the worm gear —35— which is loose on both of the shafts —32— and —32'—. A clutch collar —39'— is splined or feathered upon the counter-shaft —32'— within the gear case —33— to be moved into and out of engagement with the clutch face —40'— on the adjacent end of the hub of the worm gear —35— for starting and stopping the shaft —32'—.

The collar —39'— is provided with an annular groove for receiving a shifting member —43'— which is secured to a rod —45'—, the latter being slidably mounted in a suitable guide-opening in the gear case —33—, as shown in Figure 6. This rod —45'—, like the rod —45—, extends horizontally beyond the outer upright side of the vat and terminates in a forked head —46'— in proximity to the head —46— of the rod —45—.

A hand lever —47'— is pivoted at —48'— to a bracket —49'— on the tub near the lower end thereof and close to the bracket —49— and has its lower end pivotally connected to the forked head —46'— of the rod —45'— and its upper end disposed within convenient reaching distance of the operator and also in close proximity to the controlling lever —89— for the wringer rolls and locking lever —11— for the swinging support —6— so that all of those levers may be operated from the same position of the operator.

For a similar reason the valve —4— for the outlet —3— is located at the same side of the vat.

The lead wires, as —w— of the motor may be provided with a suitable plug adapted to be inserted in any of the usual incandescent lamp sockets for supplying current thereto and when connected to the source of electric energy serve to operate the worm gear —35— through the medium of the worm —36— on the motor shaft.

The plunger and dashers carried thereby may be started and stopped at will by the manipulation of the clutch collar —39— through the medium of the shifting lever —47—.

In a similar manner the vertical shaft —76— may be started and stopped by the shifting of the clutch member —39'— through the medium of the lever —47'— while the wringer rolls driven by the vertical shaft —76— may be operated in either direction or stopped at will by the proper operation of the lever —89—.

In placing the clothes in or removing them from the vat, the upper end of the pitman —29— may be disconnected from the adjacent end of the walking beam —23— by releasing the jaws —28— through the medium of the lever —56—, after which the locking lever —11— may be released and the support —6— rocked upwardly and radially to an inverted, horizontal position wholly outside of the vat, thereby withdrawing the plunger —14— and dashers —19— carried thereby, which leaves the full area of the interior of the tub available and accessible from top to bottom for the removal and insertion of the clothes and washing fluid.

When the various parts of the machine are adjusted for use and the machine is in operation, the dashers may automatically adjust themselves in all directions to equalize the pressure to be exerted upon different parts of the clothes of uneven thickness, this action being permitted by the swivel connections —17— and —18— and also by the resilient connections —21—.

During this reciprocatory movement of the plunger, the latter with the dashers thereon are rotated intermittently one pin space in the same direction through the medium of the pins —59— coacting with the cam members —61— and —65— in the manner previously explained.

The tub is supported at the desired height by a plurality of, in this instance three, legs —94— secured to the periphery thereof by any suitable fastening means and spaced uniform distances apart circumferentially, but it is evident that this may be otherwise supported if desired.

What I claim is:

1. In a clothes washing machine, the combination of a vat, a plate extending diametrically across the upper end of the vat and supported thereon, a vertically movable plunger rod guided in a central opening in the plate, a cross-arm centrally pivoted to the plunger rod within the vat and below said plate to rock vertically, and inverted dasher cups swivelly-connected to the opposite ends of the cross-arm.

2. In a clothes washing machine, the combination of a vat, a plate extending diametrically across the upper end of the vat and supported thereon, a vertically movable plunger rod guided in a central opening in said plate, a cross-arm pivotally mounted on the plunger rod to rock vertically relatively thereto, yielding connections between the cross-arm and plunger to restore the cross-arm to a normal position at right angles to the plunger and inverted dasher cups mounted on the opposite ends of the cross-arm.

3. In a clothes washing machine, the combination of a vat, a plate extending diametrically across the upper end of the vat and supported thereon, a vertically movable plunger rod guided in a central opening in said plate, and provided with shoulders at opposite sides thereof, a cross-arm pivoted to the plunger rod within the vat, spring connections between said shoulders and cross-arm at opposite sides of the plunger rod, and inverted dasher cups mounted on opposite ends of the cross-arm.

4. In a clothes washing machine, the combination of a vat, a plate across the top of the vat and supported thereon, a vertically movable plunger rod guided in a central opening in said plate, an arm centrally pivoted to the plunger rod to rock vertically to different angles relatively thereto, inverted dasher cups mounted on opposite ends of the arm, and means for reciprocating the plunger rod.

5. In a clothes washing machine, the combination of a vat, a plate mounted upon the upper end of the vat, a vertically movable plunger rod guided in a central opening in the plate, a cross-arm mounted on the rod within the vat, inverted dasher cups mounted on opposite ends of the cross-arm, a grooved collar on the plunger rod above said plate, a bearing mounted on the plate at one side of the plunger, a walking beam journaled on said bearing and having one end engaged with said collar, a power-driven crank-shaft below the bottom of the vat, and a pitman connection between the crank shaft and the other end of the walking beam.

6. In a clothes washing machine, the combination of a vat, a plate mounted on the upper end of the vat, and provided with a central guide-opening coaxial with the axis of the vat, a plunger rod movable vertically in said opening, a cross-arm pivotally mounted on the lower end of the rod, inverted dasher cups mounted on opposite ends of the cross-arm, a walking beam pivotally mounted on said plate to swing about a horizontal axis, connections between one end of the walking beam and plunger rod, a rotary crank-shaft below the bottom of the vat, a pitman connecting the crank-shaft to the other end of the walking beam, and means for rotating said shaft.

7. In a clothes washing machine, the combination of a vat, a plate across the top of the vat and supported thereby, a vertically movable plunger rod guided in a central opening in the plate, a cross-arm pivotally mounted on the plunger rod below the plate, inverted dasher cups mounted on opposite ends of the cross-arm, a walking beam pivotally mounted on said plate to rock in a vertical plane radial to the plunger rod, connections between the inner end of the walking beam and plunger rod, a crank shaft below the bottom of the vat, a pitman having one end connected to the outer end of the walking beam and its other end connected to the crank shaft and means for rotating said shaft.

8. In a clothes washing machine, the combination of a vat, a plate mounted on the top of the vat, a vertically movable plunger guided in a central opening in the plate, a cross-arm centrally mounted on the lower end of the plunger within the vat, inverted dasher cups mounted on opposite ends of the arm, a collar secured to the plunger rod above the plate and provided with radial pins in uniformly spaced relation, means for reciprocating the plunger, a bracket mounted upon and rising from the plate, and cams mounted on the bracket and engaged by adjacent pins as the plunger is raised for imparting an angular movement to the plunger.

9. In a clothes washing machine, the combination of a vat, a dasher-carrying plunger movable vertically through the top of the vat, a stationary cam above the vat, a collar secured to the plunger and provided with a series of radially projecting pins in uniformly spaced relation circumferentially and successively engaging said cam during each successive upward movement of the plunger for intermittently rotating said plunger in the same direction and means for causing said pins to successively engage said cam.

10. In a clothes washing machine, the combination of a vat, a vertically reciprocatory plunger coaxial with the axis of the vat, a cross-arm centrally pivoted to the plunger to rock vertically, dashers mounted on opposite ends of the cross-arm, and spring connections between the cross-arm and plunger for yieldingly holding the cross-arm in substantially a horizontal position.

In witness wherof I have hereunto set my hand this 23d day of December, 1919.

WILLARD R. WALKER.

Witnesses:
H. E. CHASE,
MARGARET L. STOUP.